(12) United States Patent
Lai et al.

(10) Patent No.: US 11,190,011 B2
(45) Date of Patent: Nov. 30, 2021

(54) SURGE CURRENT SUPPRESSION CIRCUIT

(71) Applicant: DELTA ELECTRONICS, INC., Taoyuan (TW)

(72) Inventors: Chien-An Lai, Taoyuan (TW); Chang-Yuan Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/923,647

(22) Filed: Jul. 8, 2020

(65) Prior Publication Data
US 2021/0210952 A1  Jul. 8, 2021

(30) Foreign Application Priority Data

Jan. 7, 2020 (CN) .......................... 202010013664.7

(51) Int. Cl.
*H02H 9/02* (2006.01)
*H01H 1/00* (2006.01)
*H02H 1/00* (2006.01)

(52) U.S. Cl.
CPC .......... *H02H 9/025* (2013.01); *H02H 1/0007* (2013.01)

(58) Field of Classification Search
CPC ........ G01R 19/16514; G01R 19/16519; G01R 19/16528; G01R 19/16533; G01R 19/16571; G01R 19/1659; H02H 1/0007; H02H 3/42; H02H 9/02; H02H 9/025
See application file for complete search history.

(56) References Cited

U.S. PATENT DOCUMENTS

| 7,099,135 B2 * | 8/2006 | Ball ..................... H02H 9/001 361/58 |
| 2017/0271867 A1 * | 9/2017 | Hamada .................. H02M 1/32 |

FOREIGN PATENT DOCUMENTS

| CN | 105471242 A | 4/2016 |
| JP | 2005198357 A * | 7/2005 |
| TW | M366824 U | 10/2009 |

OTHER PUBLICATIONS

Office Action of corresponding TW Patent No. 1721748, dated Jul. 17, 2020, 3 pages.

\* cited by examiner

*Primary Examiner* — Jared Fureman
*Assistant Examiner* — Nicolas Bellido
(74) *Attorney, Agent, or Firm* — Muncy, Geissler, Olds & Lowe, P.C.

(57) ABSTRACT

A surge current suppression circuit includes a switch, a bypass resistor, a detection resistor, and a comparator. The switch is coupled to a first end of an energy storage capacitor in series, wherein a second end of the energy storage capacitor is coupled to a load and receives an input power source. The bypass resistor is coupled to the switch in parallel. The detection resistor is coupled to the switch in series to generate a detection voltage according to a capacitor current flowing through the energy storage capacitor. The comparator compares the detection voltage with a reference voltage to generate a control signal. When the detection voltage is greater than the reference voltage, the control signal controls the switch to be turned off. When the detection voltage is less than the reference voltage, the control signal controls the main switch to be turned on.

15 Claims, 5 Drawing Sheets

SURGE CURRENT SUPPRESSION CIRCUIT

BACKGROUND

Technical Field

The present disclosure relates to a surge current suppression circuit, and more particularly to a surge current suppression circuit that a surge current caused by the input power source during a hold-up time can be greatly suppressed.

Description of Related Art

The statements in this section merely provide background information related to the present disclosure and do not necessarily constitute prior art.

In the actual use of various electrical devices, especially at the moment of plugging and unplugging the power plug, there are often phenomena such as sparks and even pops. This is because the occurrence of a large inrush current has not been effectively suppressed, resulting in an arc effect when two conductors instantaneously contact. Obviously, for consumers, the phenomenon of sparks and even pops of the plug not only greatly affects the consumer's experience, but also causes the plug to be damaged over time, thereby causing poor contact and heat generation and increasing security risks. In addition, it may also cause instant fluctuations in the noise on the power grid and severely interfere with nearby power facilities.

A common practice is to connect a resistor with the current loop at the input end in series. This resistor can be a negative temperature coefficient resistor, a positive temperature coefficient resistor, or a general resistor to limit the surge current at the moment of activating. In addition, in order to reduce the loss, a switch is connected at both ends of the resistor in parallel. The switch can be a relay, a transistor, and other components. After the surge current is over, the switch is turned on to reduce the loss.

However, the system needs to maintain stable operation during the unstable interval when the input power is instantaneously powered down and then back. Therefore, the power supply will be required to maintain the output voltage for a certain period of time when the input power is powered down, and this period of time is referred to as hold-up time. As the power density requirements become higher, the requirements for the hold-up time become greater. During the power failure, the voltage of the internal energy storage capacitor will be used as low as possible so that when the AC power returns, the voltage difference between the input grid and the internal energy storage capacitor voltage will still cause high surge current. Although this conventional practice effectively solves the surge current at the moment of activating, it cannot control the current magnitude when returning after the hold-up time, which causes the power grid to be more unstable, severely interferes with the surrounding power facilities, and damages the upstream breaker, thereby causing the entire system to stop operating.

Please refer to FIG. 1 and FIG. 2, which show a circuit diagram of a power supply system of the related art and a voltage and current waveform of the power supply system that power down and power back occurs in FIG. 1, respectively. As shown in FIG. 1, the switch $S_W$, for example a breaker is turned on and the input power source Vdc is instantaneously powered down and then back. A time point t1 is the time point when the power down occurs (i.e., the power supply is stable before the time point t1), and a time point t2 is the time point when the power returns. Therefore, the time point t1 to the time point t2 is an unstable period for the system power supply. At this time period, the power supply required for the load $R_L$ is supplied by the capacitor C1, that is, the energy storage on the capacitor C1 is drawn by the load $R_L$. Starting at time t1, the output voltage Vb of the system gradually decreases since the capacitor C1 continuously supplies the power required to the load $R_L$. Incidentally, the input power source Vdc shown in FIG. 1 is a DC power source obtained by omitting a rectifying circuit of rectifying an AC power source. Therefore, the DC input power supply Vdc represents the situation of power failure and return, which is equivalent to the AC input power failure and return.

When the input power source Vdc returns at the time point t2, the output voltage Vb instantaneously increases at the time point t2, resulting in a large inrush current flowing through the capacitor C1 (i.e., the capacitor current $I_{C1}$). As shown in FIG. 2, when the input power Vdc is normally supplied, the magnitude of the capacitor current $I_{C1}$ is about 7 to 10 amps, and when the situation of instantaneous power back after power failure occurs, the magnitude of the capacitor current $I_{C1}$ is about 400 amps. Such a large surge current will at least cause damage to the switch $S_W$ (i.e., circuit breaker), and it will cause system circuit failure at the worst case.

For this reason, how to design a surge current suppression circuit that can significantly suppress the surge current caused by the input power supply during the hold-up time to solve the aforementioned technical problems is important subject by the inventors of the present disclosure.

SUMMARY

An object of the present disclosure is to provide a surge current suppression circuit to solve the above-mentioned problems.

In order to achieve the above-mentioned object, the surge current suppression circuit includes a switch, a bypass resistor, a detection resistor, and a comparator. The switch is coupled to a first end of an energy storage capacitor in series, wherein a second end of the energy storage capacitor is coupled to a load and receives an input power source, wherein the energy storage capacitor stabilizes the input power source provided to the load. The bypass resistor is coupled to the switch in parallel. The detection resistor is coupled to the switch in series, and generates a detection voltage according to a capacitor current flowing through the energy storage capacitor. The comparator compares the detection voltage with a reference voltage to generate a control signal. When the detection voltage is greater than the reference voltage, the switch is turned off by the control signal; when the detection voltage is less than the reference voltage, the switch is turned on by the control signal.

In one embodiment, when the switch is turned off, the capacitor current flows through the detection resistor through the bypass resistor so as to reduce the capacitor current.

In one embodiment, when the capacitor current is greater than or equal to a upper threshold current, the detection voltage is greater than the reference voltage; when the capacitor current is less than or equal to a lower threshold current, the detection voltage is less than the reference voltage.

In one embodiment, the surge current suppression circuit further includes an amplifier. The amplifier amplifies the detection voltage and outputs the amplified detection voltage to the comparator.

In one embodiment, in response to a transient voltage change of the input power source; when the capacitor current is greater than or equal to the upper threshold current, the comparator controls the switch to be turned off, and the capacitor current flows through the bypass resistor so that the capacitor current is decreased; when the capacitor current is less or equal to the lower threshold current, the comparator controls the switch to be turned on, and the capacitor current flows through the switch so that the capacitor current is increased.

In one embodiment, a first end of the switch is coupled to the second end of the energy storage capacitor and a first end of the bypass resistor; a second end of the switch is coupled to a second end of the bypass resistor and a first end of the detection resistor.

In one embodiment, the first end and a second end of the detection resistor are respectively coupled to a first input end and a second input end of the amplifier; an output end of the amplifier is coupled to a first input end of the comparator; a second input end of the comparator receives the reference voltage and an output end of the comparator is coupled to a control end of the switch.

Accordingly, the main switch can be directly turned on and turned off to make the capacitor current flow through the current paths of different resistance values so as to effectively adjust the magnitude of the capacitor current and the capacitor current that is instantaneously returned after power failure can be effectively suppressed and controlled.

Another object of the present disclosure is to provide a power circuit to solve the above-mentioned problems.

In order to achieve the above-mentioned object, the power circuit provides an input power source to a load, and the power circuit includes an energy storage capacitor and a surge current suppression circuit. The energy storage capacitor is coupled to the input power source and the load, wherein the energy storage capacitor stabilizes the input power source provided to the load, and a capacitor current flowing through the energy storage capacitor. The surge current suppression circuit is coupled to the energy storage capacitor in series. In response to a transient voltage change of the input power source; when the capacitor current is greater than or equal to an upper threshold current, the surge current suppression circuit controls the capacitor current to be decreased; when the capacitor current is less than or equal to a lower threshold current, the surge current suppression circuit controls the capacitor current to be increased.

In one embodiment, the surge current suppression circuit includes a switch, a bypass resistor, a detection resistor, and a comparator. The switch is coupled to a first end of the energy storage capacitor in series, wherein a second end of the energy storage capacitor is coupled to the load and receives an input power source. The bypass resistor is coupled to the switch in parallel. The detection resistor is coupled to the switch in series, and generates a detection voltage according to a capacitor current flowing through the energy storage capacitor. The comparator compares the detection voltage with a reference voltage to generate a control signal. When the detection voltage is greater than the reference voltage, the switch is turned off by the control signal; when the detection voltage is less than the reference voltage, the switch is turned on by the control signal.

In one embodiment, when the switch is turned off, the capacitor current flows through the detection resistor through the bypass resistor so as to decrease the capacitor current.

In one embodiment, when the capacitor current is greater than or equal to the upper threshold current, the detection voltage is greater than the reference voltage; when the capacitor current is less than or equal to the lower threshold current, the detection voltage is less than the reference voltage.

In one embodiment, the surge current suppression circuit further includes an amplifier. The amplifier amplifies the detection voltage and output the amplified detection voltage to the comparator.

In one embodiment, in response to a transient voltage change of the input power source; when the capacitor current is greater than or equal to the upper threshold current, the comparator controls the switch to be turned off, and the capacitor current flows through the bypass resistor so that the capacitor current is decreased; when the capacitor current is less or equal to the lower threshold current, the comparator controls the switch to be turned on, and the capacitor current flows through the switch so that the capacitor current is increased.

Accordingly, the switch can be directly turned on and turned off to make the capacitor current flow through the current paths of different resistance values so as to effectively adjust the magnitude of the capacitor current and the capacitor current that is instantaneously returned after power failure can be effectively suppressed and controlled.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
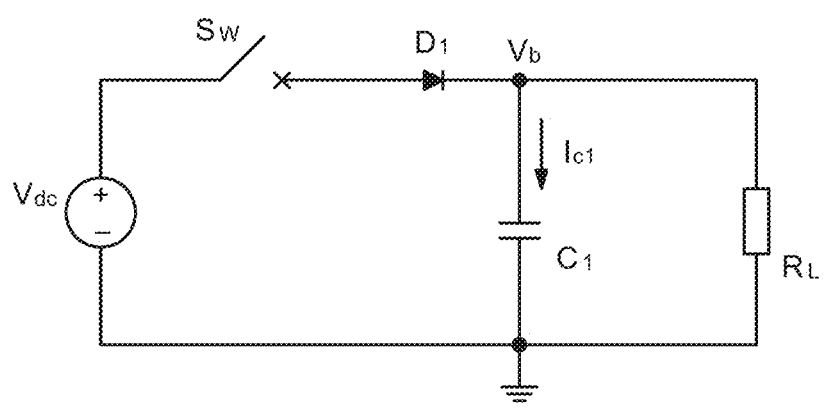
FIG. 1 is a circuit diagram of a power supply system of the related art.

Reference will now be made to the drawing figures to describe the present disclosure in detail. It will be understood that the drawing figures and exemplified embodiments of present disclosure are not limited to the details thereof.

Figure 3:
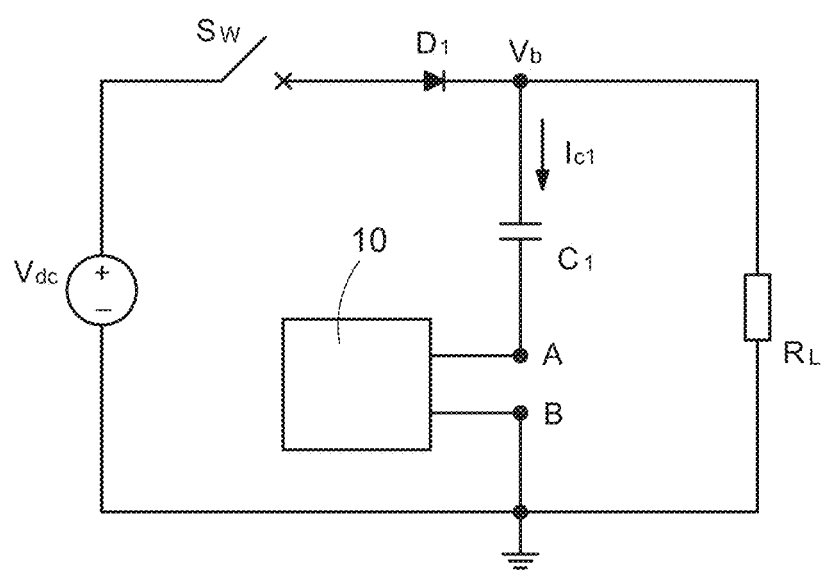
FIG. 3 is a block circuit diagram of a power supply system having a surge current suppression circuit according to the present disclosure.

Please refer to FIG. 3, which shows a block circuit diagram of a power supply system having a surge current suppression circuit according to the present disclosure. The surge current suppression circuit 10 is applied to a power supply system shown in FIG. 1. That is, the current suppression circuit 10 is applied to a circuit structure having an input power source Vdc coupled to an energy storage capacitor C1 and a load $R_L$. Two ends of the current suppression circuit 10 are coupled between one end (point A) of the energy storage capacitor C1 and a ground end (point B), that is, the current suppression circuit 10 and the energy storage capacitor C1 are coupled on the same path.

Figure 4:
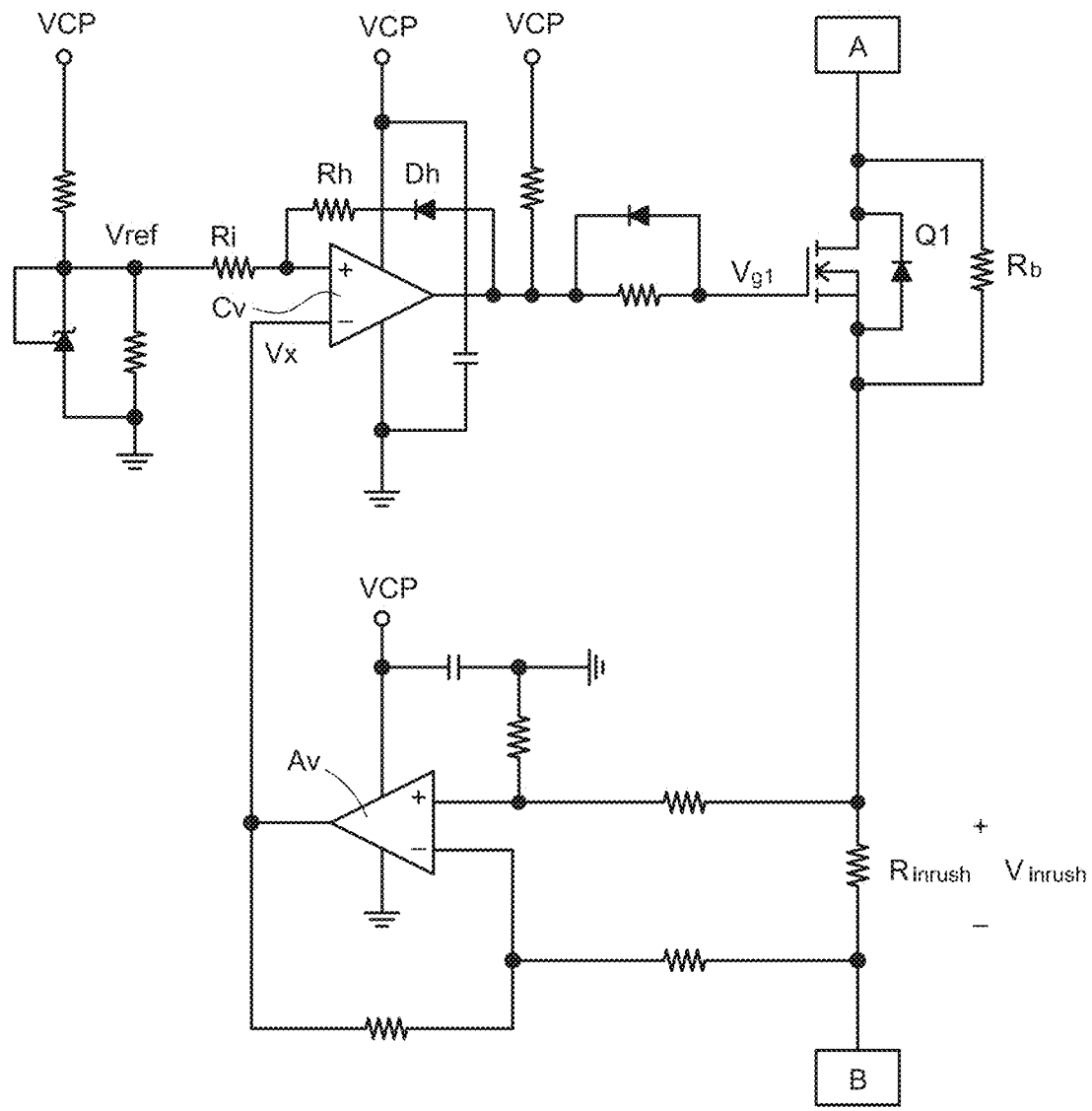
FIG. 4 is a circuit diagram of the surge current suppression circuit according to an embodiment of the present disclosure.

Please refer to FIG. 4, which shows a circuit diagram of the surge current suppression circuit according to an embodiment of the present disclosure. The current suppression circuit 10 mainly includes a main switch Q1, a bypass resistor Rb, a detection resistor $R_{inrush}$, and a comparator Cv. The bypass resistor Rb is coupled to the main switch Q1 in parallel to form a parallel-connected structure. Take a metal-oxide-semiconductor field-effect transistor (MOSFET) as the main switch Q1 for example, the bypass resistor Rb is coupled between a drain and a source of the MOSFET in parallel. The detection resistor $R_{inrush}$ is coupled to the parallel-connected structure in series. The detection resistor $R_{inrush}$ generates a detection voltage $V_{inrush}$ according to a capacitor current $I_{C1}$ flowing through the energy storage capacitor C1. That is, the detection voltage $V_{inrush}$ across two ends of the detection resistor $R_{inrush}$ is equal to the product of the capacitor current $I_{C1}$ and the detection resistor $R_{inrush}$ (i.e., $V_{inrush}=I_{C1}\times R_{inrush}$). Therefore, if the capacitor current $I_{C1}$ is larger, the obtained detection voltage $V_{inrush}$ is also larger, and vice versa.

The comparator Cv receives the detection voltage $V_{inrush}$ and a reference voltage Vref, and compares the detection voltage $V_{inrush}$ with the reference voltage Vref. In particular, the reference voltage Vref is an adjustable reference voltage, which can be obtained by dividing a power voltage VCP by using a voltage dividing circuit, but this is not a limitation of the present disclosure.

In addition, the current suppression circuit 10 further includes a hysteresis unit, and the hysteresis unit is composed of a diode Dh and a resistor Rh. Specifically, a cathode of the diode Dh is coupled to one end of the resistor Rh to form a series-connected structure of the hysteresis unit. One end of the series-connected structure (i.e., an anode end of the diode Dh) is coupled an output end of the comparator Cv, and the other end of the series-connected structure (i.e., the other end of the resistor Rh) is coupled to a non-inverting input end of the comparator Cv.

When a voltage received by an inverting input end of the comparator Cv is greater than a voltage received by the non-inverting input end, the comparator Cv outputs a low-level voltage (i.e., a ground voltage). The low-level voltage makes the diode Dh be reversed-biased and turned off, and therefore the hysteresis unit is equivalent to an open-circuit state. In this state, the voltage received by the non-inverting input end of the comparator Cv is not affected. On the contrary, when the voltage received by the inverting input end of the comparator Cv is less than the voltage received by the non-inverting input end, the comparator Cv outputs a high-level voltage (i.e., the power voltage VCP). The high-level voltage makes the diode Dh be forward-biased and turned on, and therefore it is equivalent to add the resistor Rh to the non-inverting input end of the comparator Cv. Accordingly, the power voltage VCP is divided by the resistor Rh and an input resistor Ri to increase the voltage received by the non-inverting input end.

Therefore, through the hysteresis unit, the inverting input end of the comparator Cv can provide a stable output within the aforementioned increased voltage range (i.e., the hysteresis range). Accordingly, the two input ends of the comparator Cv can be changed from the comparison of "voltage point" to the comparison of "voltage range" (hysteresis range). It is to allow the voltage received by the inverting input of the comparator Cv to fluctuate within the hysteresis range and still obtain a stable output.

When the capacitor current $I_{C1}$ flowing through the energy storage capacitor C1 is greater than or equal to a upper threshold current, the detection voltage $V_{inrush}$ is greater than the reference voltage Vref so that the comparator Cv controls the main switch Q1 to be turned off. At this condition, the capacitor current $I_{C1}$ flows through the bypass resistor Rb connected to the main switch Q1 in parallel to be decreased so as to achieve the suppression of the capacitor current $I_{C1}$ that is greater than or equal to the upper threshold current. On the contrary, when the capacitor current $I_{C1}$ is less than or equal to a lower threshold current, the detection voltage $V_{inrush}$ is less than the reference voltage Vref so that the comparator Cv controls the main switch Q1 to be turned on. At this condition, the capacitor current $I_{C1}$ flows through the main switch Q1 to be increased. In particular, the upper threshold current is greater than the lower threshold current. Therefore, by directly controlling the main switch Q1 to be turned on or turned off, the capacitor current $I_{C1}$ flows through different current paths. Due to different resistance values of the different current paths, the magnitude of the capacitor current $I_{C1}$ is effectively adjusted so that the capacitor current $I_{C1}$ that is instantaneously returned after a power failure can be effectively suppressed and controlled.

In one embodiment, the surge current suppression circuit 10 further includes a voltage amplifier Av. Two input ends of the voltage amplifier Av are coupled to the detection resistor $R_{inrush}$ and an output end of the voltage amplifier Av is coupled to the comparator Cv. In particular, two input ends of the voltage amplifier Av are respectively coupled to two ends of the detection resistor $R_{inrush}$ to amplify the detection voltage $V_{inrush}$ in a differential amplification manner.

The function of the surge current suppression circuit 10 in the case of a change in a transient voltage in response to the input power will be described hereinafter. In this embodiment, a transient voltage change of the input power refers to a condition in which the input power source Vdc is instantaneously powered down and then back. Specifically, the input power source Vdc instantaneously powered down and then back means the input power source Vdc drops from the normal working voltage to the abnormal working voltage within a time, and then returns to the normal working voltage. For example, the input power source Vdc drops from a normal working voltage (for example, 127 volts to 370 volts) to an abnormal voltage (for example, 0 volt to 100 volts) within 10 milliseconds to 20 milliseconds, and then returns to the normal working voltage (i.e., 127 volts to 370 volts), but this is not a limitation of the present disclosure. In other embodiments, the input power source Vdc may be obtained by converting an AC power source through a rectifier. The condition that the input power source Vdc is instantaneously powered down and then back may be, for example that the AC power source drops from a normal working voltage (for example, 90 volts to 264 volts) to an abnormal voltage (for example, 0 volt to 70 volts), and then returns to the normal working voltage (i.e., 90 volts to 264 volts) so that the input power Vdc is corresponding to the change of the AC power, but the present disclosure is not limited thereto.

Figure 5:
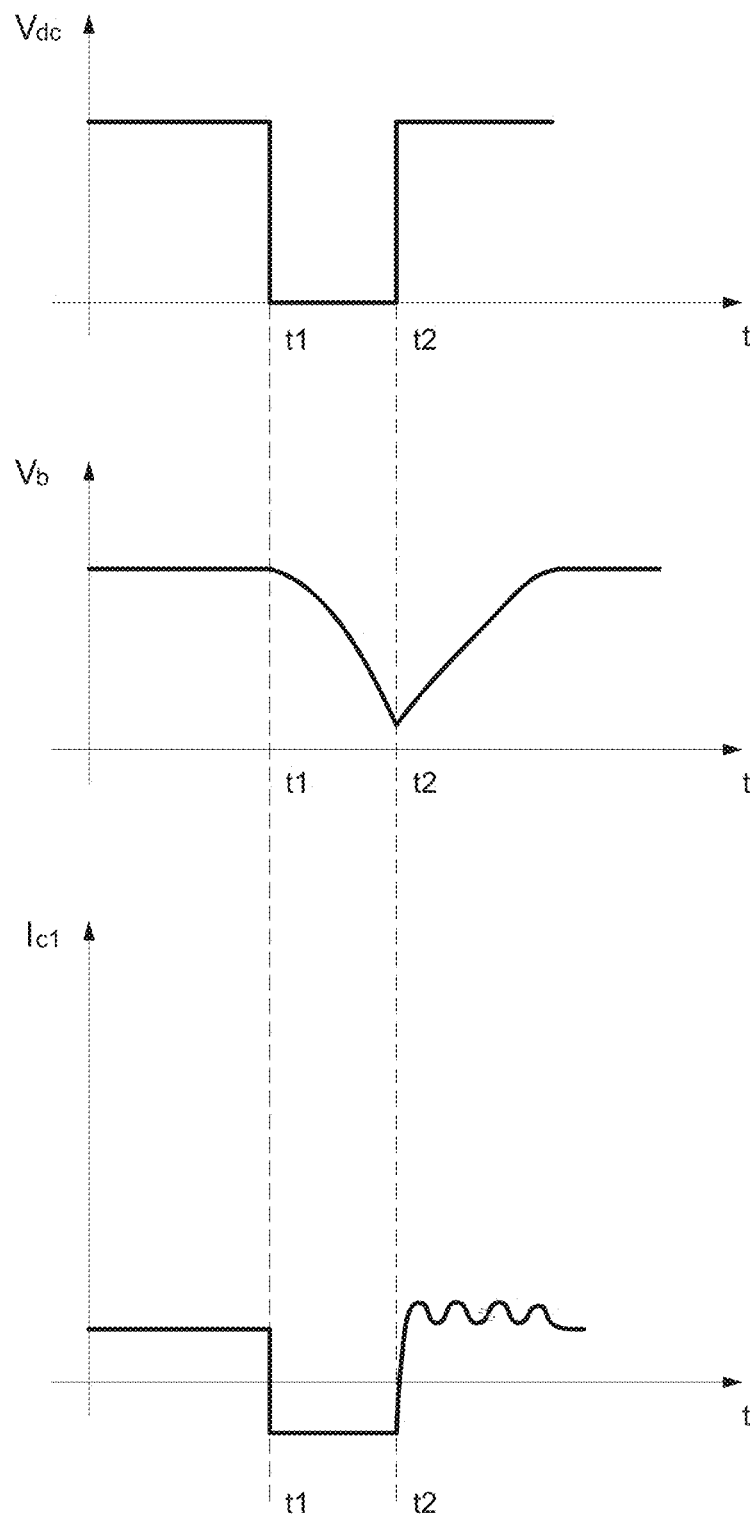
FIG. 5 is a voltage and current waveform of the power supply system having the surge current suppression circuit according to the present disclosure.

Please refer to FIG. 4 and FIG. 5. FIG. 5 shows a voltage and current waveform of the power supply system having the surge current suppression circuit according to the present disclosure.

Figure 2:
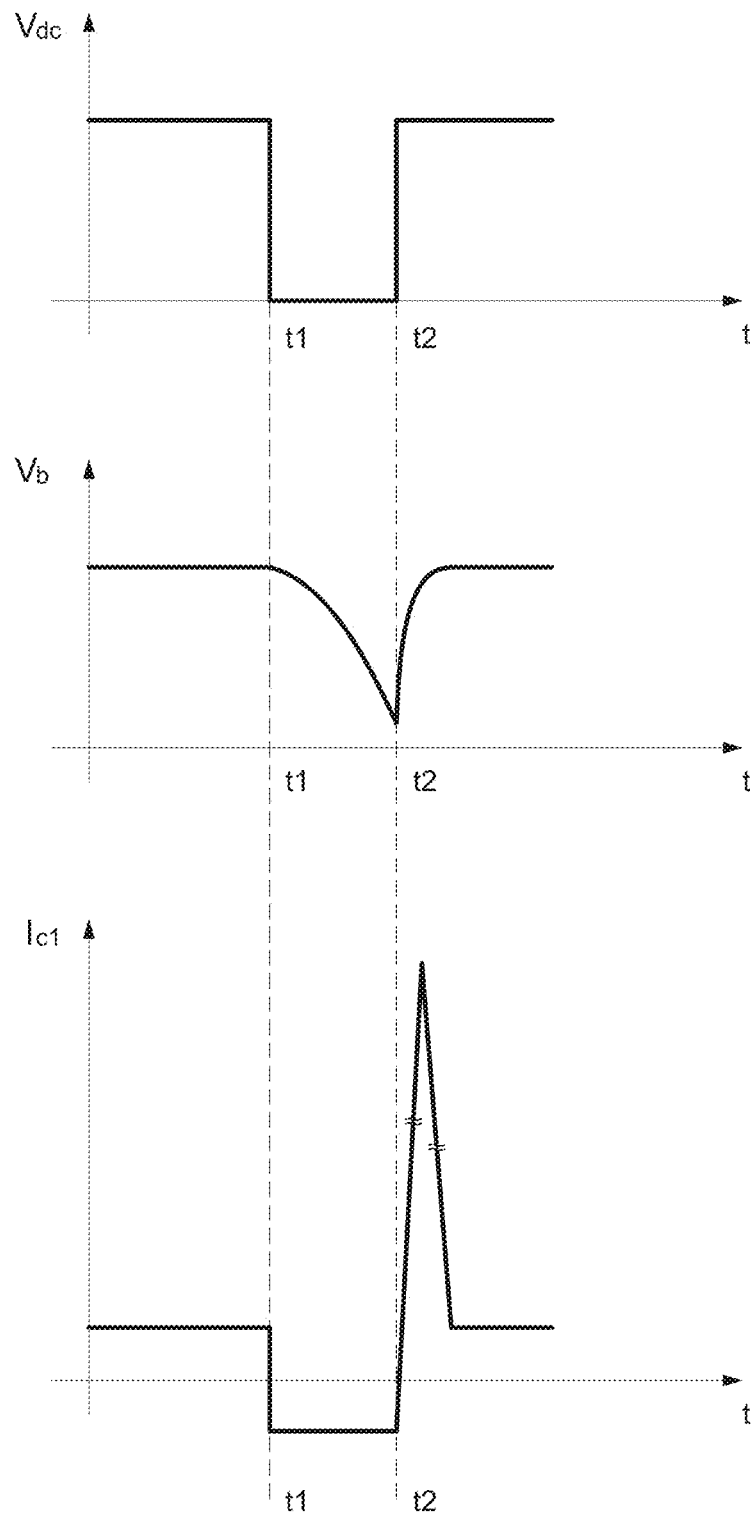
FIG. 2 is a voltage and current waveform of the power supply system that power down and power back occurs in FIG. 1.

It is assumed that the input power source Vdc of the power supply system drops at a time t1, and therefore the power required by the load $R_L$ is provided by the energy storage capacitor C1. When the energy storage capacitor C1 is drawn by the load $R_L$, the output voltage Vb gradually decreases. At a time t2, the input power source Vdc returns to the normal working voltage. At this condition, the output voltage Vb gradually increases. Since the capacitor current $I_{C1}$ flowing through the energy storage capacitor C1 is suppressed, the degree of increase (slope) of the output voltage Vb is smaller than that of the output voltage Vb shown in FIG. 2. Since the capacitor current $I_{C1}$ is suppressed, it can be seen from FIG. 5 that the capacitor current $I_{C1}$ does not increase instantaneously with the surge of the capacitor current $I_{C1}$ shown in FIG. 2. The description of suppression and adjustment of the capacitor current $I_{C1}$ is as follows.

When the output voltage Vb is instantaneously increased, the capacitor current $I_{C1}$ is instantaneously increased. However, since the capacitor current $I_{C1}$ is greater than or equal to the upper threshold current, for example but not limited to 15 amps, the detection voltage $V_{inrush}$ is greater than the reference voltage Vref assumed to be 1 volt. In one embodiment, the detection resistor $R_{inrush}$ is about 0.01 ohms, and therefore the detection voltage $V_{inrush}$ is about 0.15 volts. Further, the detection voltage $V_{inrush}$ is amplified by the voltage amplifier Av, and it is assumed that a gain voltage Vx of the voltage amplifier Av is about 1.5 volts. Since the gain voltage Vx is greater than the reference voltage Vref, the comparator Cv outputs a gate control voltage Vg1 with a low-level voltage. Since the gate control voltage Vg1 fails to drive the main switch Q1 to be turned on, the capacitor current $I_{C1}$ flows through the bypass resistor Rb so that the capacitor current $I_{C1}$ is decreased. Therefore, the capacitor current $I_{C1}$ is suppressed, and the capacitor current $I_{C1}$ is prevented from instantaneously increasing in a surge manner.

During the reduction of the capacitor current $I_{C1}$, if the capacitor current $I_{C1}$ is less than or equal to the lower threshold current, for example but not limited to 8 amps, the gain voltage Vx obtained after the detection voltage $V_{inrush}$ is amplified by the voltage amplifier Av is 0.8 volts. Since the gain voltage Vx is less than the reference voltage Vref, the comparator Cv outputs the gate control voltage Vg1 with a high-level voltage. The gate control voltage Vg1 drives the main switch Q1 to be turned on, the capacitor current $I_{C1}$ flows through the main switch Q1. Since an on-resistance RDS(on) of the main switch Q1 is relatively small compared to the bypass resistance Rb (for example but not limited to about 25 ohms), the capacitor current $I_{C1}$ flowing through the main switch Q1 will increase. However, once the capacitor current $I_{C1}$ increases to be greater than or equal to the upper threshold current, the comparator Cv outputs the low-voltage gate control voltage Vg1 again to turn off the main switch Q1 so that the capacitor current $I_{C1}$ flowing through the bypass resistor Rb again is suppressed. Accordingly, the capacitor current $I_{C1}$ presents a steady-state oscillation during the increase and decrease as shown in FIG. 5. Until the surge energy is released, the capacitor current $I_{C1}$ returns to the steady-state current. Therefore, the surge current suppression circuit 10 can achieve the effect that the surge current caused by the input power source during the hold-up time can be greatly suppressed.

In conclusion, the present disclosure has following features and advantages:

1. The surge current can be suppressed and adjusted by using simple switches, detection resistors, and comparison circuits.

2. The main switch can be directly turned on and turned off to make the capacitor current flow through the current paths of different resistance values so as to effectively adjust the magnitude of the capacitor current and the capacitor current that is instantaneously returned after power failure can be effectively suppressed and controlled.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A surge current suppression circuit comprising:
   a switch coupled to a first end of an energy storage capacitor in series, wherein a second end of the energy storage capacitor is coupled to a load and configured to receive an input power source, wherein the energy storage capacitor is configured to stabilize the input power source provided to the load,
   a bypass resistor coupled to the switch in parallel,
   a detection resistor coupled to the switch in series, and configured to generate a detection voltage according to a capacitor current flowing through the energy storage capacitor, and
   a comparator configured to compare the detection voltage with a reference voltage to generate a control signal,
   wherein when the detection voltage is greater than the reference voltage, the switch is turned off by the control signal; when the detection voltage is less than the reference voltage, the switch is turned on by the control signal.

2. The surge current suppression circuit in claim 1, wherein when the switch is turned off, the capacitor current flows through the detection resistor through the bypass resistor so as to reduce the capacitor current.

3. The surge current suppression circuit in claim 1, wherein when the capacitor current is greater than or equal to a upper threshold current, the detection voltage is greater than the reference voltage; when the capacitor current is less than or equal to a lower threshold current, the detection voltage is less than the reference voltage.

4. The surge current suppression circuit in claim 1, further comprising:
   an amplifier configured to amplify the detection voltage and output the amplified detection voltage to the comparator.

5. The surge current suppression circuit in claim 4, wherein a first end of the switch is coupled to the second end of the energy storage capacitor and a first end of the bypass resistor; a second end of the switch is coupled to a second end of the bypass resistor and a first end of the detection resistor.

6. The surge current suppression circuit in claim 5, wherein the first end and a second end of the detection resistor are respectively coupled to a first input end and a second input end of the amplifier; an output end of the amplifier is coupled to a first input end of the comparator; a second input end of the comparator is configured to receive the reference voltage and an output end of the comparator is coupled to a control end of the switch.

7. The surge current suppression circuit in claim 1, wherein in response to a transient voltage change of the input power source; when the capacitor current is greater than or equal to the upper threshold current, the comparator is configured to control the switch to be turned off, and the capacitor current flows through the bypass resistor so that the capacitor current is decreased; when the capacitor current is less or equal to the lower threshold current, the comparator is configured to control the switch to be turned on, and the capacitor current flows through the switch so that the capacitor current is increased.

8. The surge current suppression circuit in claim 1, further comprising:
   a hysteresis unit coupled between an output end of the comparator and an input end of the comparator which configured to receive the reference voltage, wherein the hysteresis unit is configured to provide a stable output within a voltage range increased at the input end of the comparator.

9. The surge current suppression circuit in claim 8, wherein the hysteresis unit comprises:
   a resistor, and
   a diode coupled to the resistor in series; wherein an anode of the diode is coupled to the output end of the comparator and a cathode of the diode is coupled to the input end of the comparator.

10. A power circuit configured to provide an input power source to a load, the power circuit comprising:
    an energy storage capacitor coupled to the input power source and the load, wherein the energy storage capacitor is configured to stabilize the input power source provided to the load, and a capacitor current flowing through the energy storage capacitor, and
    a surge current suppression circuit coupled to the energy storage capacitor in series,
    wherein in response to a transient voltage change of the input power source; when the capacitor current is greater than or equal to an upper threshold current, the surge current suppression circuit is configured to control the capacitor current to be decreased; when the capacitor current is less than or equal to a lower threshold current, the surge current suppression circuit is configured to control the capacitor current to be increased.

11. The power circuit in claim 10, wherein the surge current suppression circuit comprises:
    a switch coupled to a first end of the energy storage capacitor in series, wherein a second end of the energy storage capacitor is coupled to the load and configured to receive an input power source,
    a bypass resistor coupled to the switch in parallel,
    a detection resistor coupled to the switch in series, and configured to generate a detection voltage according to a capacitor current flowing through the energy storage capacitor, and
    a comparator configured to compare the detection voltage with a reference voltage to generate a control signal,
    wherein when the detection voltage is greater than the reference voltage, the switch is turned off by the control signal; when the detection voltage is less than the reference voltage, the switch is turned on by the control signal.

12. The power circuit in claim 11, wherein when the switch is turned off, the capacitor current flows through the detection resistor through the bypass resistor so as to decrease the capacitor current.

13. The power circuit in claim 11, wherein when the capacitor current is greater than or equal to the upper threshold current, the detection voltage is greater than the reference voltage; when the capacitor current is less than or equal to the lower threshold current, the detection voltage is less than the reference voltage.

14. The power circuit in claim 11, wherein the surge current suppression circuit further comprises:
    an amplifier configured to amplify the detection voltage and output the amplified detection voltage to the comparator.

15. The power circuit in claim 11, wherein in response to a transient voltage change of the input power source; when the capacitor current is greater than or equal to the upper threshold current, the comparator is configured to control the switch to be turned off, and the capacitor current flows through the bypass resistor so that the capacitor current is decreased; when the capacitor current is less or equal to the lower threshold current, the comparator is configured to control the switch to be turned on, and the capacitor current flows through the switch so that the capacitor current is increased.

* * * * *